D. W. S. Rawson.

App. for Multiplying Photographic Images.

№ 89,342.  Patented Apr. 27, 1869.

Witnesses.
Cook Ely
M. E. L. Chubbuck

Inventor.
D. W. S. Rawson

D. W. S. RAWSON, OF PERU, ILLINOIS.

Letters Patent No. 89,342, dated April 27, 1869.

APPARATUS FOR MULTIPLYING PHOTOGRAPHIC IMAGES.

The Schedule referred to in these Letters Patent and making part of the same.

Be it known that I, D. W. S. RAWSON, of the city of Peru, county of La Salle, and State of Illinois, have invented a new and improved Method of Multiplying the Images in a Common Photographic Camera; and I hereby declare the following to be a full and exact description thereof, reference being had to the accompanying drawings, and the letters of reference marked thereon.

Figure 1:
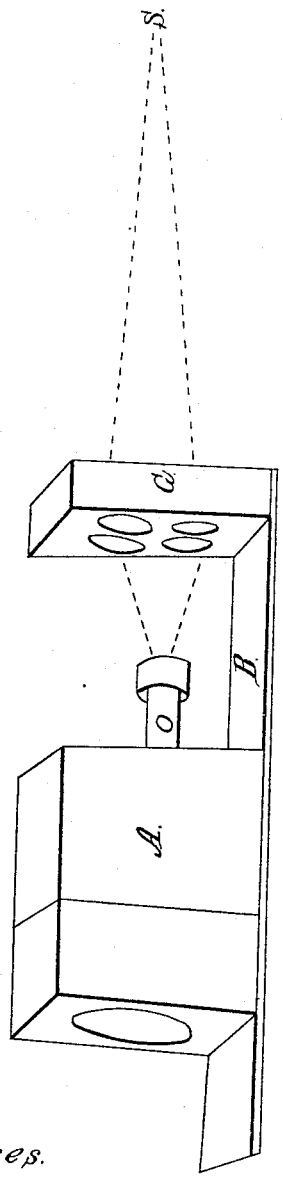

The nature of my invention consists in arranging, in front of a common camera-lens, a set of lenses of prism shape, or, what I prefer, the sectional parts of a concave lens, of sufficient refractive power to turn the light from the subject sufficiently for each part to produce an impression in the camera, as represented in Figure 1, where A is the camera, C, a box, containing the multiplying-lenses, and S, the subject, the dotted lines showing the direction of the light.

Figure 4:
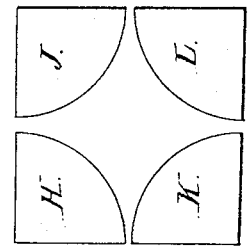
Figure 3:
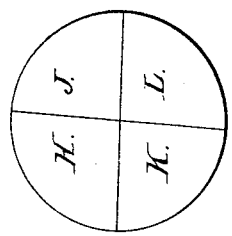

To construct such an apparatus, I first procure a concave lens, in size about four inches in diameter for ordinary work. I cut this into as many sections of equal size as it is intended to make pictures at one impression; if no more than four are required, they should be cut as in Figure 3, H, I, K, and L representing the different sections. The several sections are then reversed, as shown in Figure 4.

In this position H, I, K, and L are set in a frame, and, for ordinary work, permanently; but when desired to give the instrument the greatest range, the frame should be so arranged as to allow the sections to move to and from the centre, to vary the angle, to suit different distances between the camera and multiplier. The frame is then placed in the box C, which is fastened to the base-board B, with the centre of the lenses the same height from the board as the centre of the camera-lens. If the camera is now placed on the board, as shown in fig. 1, and directed to the subject, a number of images will be produced in the camera equal to the number of sections used.

I prefer using the sections taken from one lens only, as a slight variation in the foci of different lenses would interfere with the sharpness of the different images in the camera.

As the position of the subject in each sectional lens will vary according to the distance between the multiplier and the camera, I arrange a set of movable blenders between, with openings a size smaller than the lenses, to move to and from the centre, and thus keep the subject in the centre of each illuminated division in the camera.

These blenders may be of any shade desired, and made of paper, or other material, and as they act on the plate surrounding the different images, a light neutral tint will produce a pleasing effect, similar to the style of card-photographs called vignettes.

Figure 2:
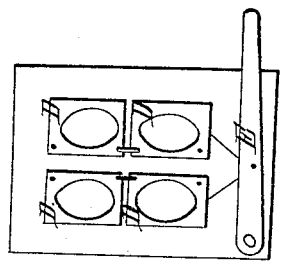

The blenders may be moved by any device that will give them their proper positions, a convenient way being shown in fig. 2, with pivots, and the lever E.

The blenders should be placed about one diameter of the sectional lenses away, which, with the sides and top of the box, will form a perfect shade for the lenses.

What I claim as my invention, and desire to secure by Letters Patent, is—

1. The sectional parts of a concave lens, in front of a camera-lens, for multiplying the number of images in the camera.

2. The adjustable blenders D D D D, fig. 2, moving to and from the centre, by this, or an equivalent device, also the same movement for the lenses.

3. The box C, for shading the lenses when in use, and protecting from dust when not in use.

D. W. S. RAWSON.

Witnesses:
COOK ELY,
M. E. L. CHUBBUCK.